United States Patent
Murakami et al.

(10) Patent No.: US 8,199,427 B2
(45) Date of Patent: Jun. 12, 2012

(54) DISK DRIVE INCLUDING A SHROUD CONFIGURED TO OVERLAP AN ACTUATOR FOR REMOVING DEBRIS FROM A HEAD-SLIDER

(75) Inventors: Kazuhisa Murakami, Kanagawa-ken (JP); Teruyoshi Higashiya, Kanagawa (JP); Mitsuhiko Oguchi, Kanagawa-ken (JP); Masanobu Honda, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 357 days.

(21) Appl. No.: 12/512,923

(22) Filed: Jul. 30, 2009

(65) Prior Publication Data

US 2010/0027160 A1 Feb. 4, 2010

(30) Foreign Application Priority Data

Jul. 30, 2008 (JP) .................. 2008-197097

(51) Int. Cl.
*G11B 33/14* (2006.01)
(52) U.S. Cl. .................. 360/97.13; 360/97.14
(58) Field of Classification Search .... 360/97.02–99.12, 360/254.2–255
See application file for complete search history.

(56) References Cited

U.S. PATENT DOCUMENTS

| 5,898,545 A | 4/1999 | Schirle |
| 6,084,753 A * | 7/2000 | Gillis et al. .................. 360/128 |
| 7,551,402 B2 * | 6/2009 | Hayakawa ................ 360/254.7 |
| 2006/0209456 A1 | 9/2006 | Bisuwasu et al. |
| 2006/0221802 A1 | 10/2006 | Hayakawa et al. |
| 2007/0230038 A1 | 10/2007 | Eguchi |

FOREIGN PATENT DOCUMENTS

| JP | 08279120 | 10/1996 |
| JP | 2003317464 | 11/2003 |
| JP | 2006351199 | 12/2006 |

* cited by examiner

*Primary Examiner* — Allen Heinz (57) ABSTRACT

A disk drive. The disk drive includes a head-slider, an actuator, a ramp and a shroud. The head-slider is configured to fly above the disk. The actuator is configured to support the head-slider and to swing about a pivot shaft to move the head-slider in a radial direction of the disk. The actuator may also be configured to rest on the ramp in a stand-by position. The shroud includes an inner peripheral side surface and an outer peripheral side surface. The shroud is configured to control an air-stream which flows in a direction from the pivot shaft toward the head-slider. The inner peripheral side surface and the outer peripheral side surface are configured to blast the head-slider with the air-stream upon spinning the disk when the head-slider is positioned away from the disk in the stand-by position.

11 Claims, 10 Drawing Sheets

DISK DRIVE INCLUDING A SHROUD CONFIGURED TO OVERLAP AN ACTUATOR FOR REMOVING DEBRIS FROM A HEAD-SLIDER

CROSS-REFERENCE TO RELATED APPLICATION

This application claims priority from the Japanese Patent Application No. 2008-197097, filed Jul. 30, 2008, the disclosure of which is incorporated herein in its entirety by reference.

TECHNICAL FIELD

Embodiments of the present invention relate to a disk drive including a shroud for removing debris from a head-slider.

BACKGROUND

Disk drives using various kinds of disks, such as optical disks, magneto-optical disks, flexible magnetic-recording disks and, as this list is not exhaustive, other types of disks, are known in the art. In particular, hard-disk drives (HDDs) are widely used as computer storage devices and are indispensable storage devices for contemporary computer systems. Moreover, HDDs have found widespread application to video recording and reproducing equipment, car navigation systems, cellular phones, and similar devices, in addition to computers, because of their outstanding information storage capabilities.

In the process of writing data to and reading data from a magnetic-recording disk, a head-slider flies over a spinning magnetic-recording disk. Deposition of debris onto a head-slider's air bearing surface (ABS) may cause data loss such as a write error or a read error. These errors seem to be caused, in part, by increased fly-height of the head-slider because of the debris deposit on the ABS, or alternatively, a change in the fly-height because of contact between the head-slider and the magnetic-recording disk resulting from the debris deposit. Thus, development engineers and scientists engaged in the design of the HDDs are interested in controlling, or eliminating, the accumulation of debris deposits on head-sliders used in HDDs.

SUMMARY

Embodiments of the present invention include a disk drive. The disk drive includes a head-slider, an actuator, a ramp and a shroud. The head-slider is configured to fly above the disk. The actuator is configured to support the head-slider and to swing about a pivot shaft to move the head-slider in a radial direction of the disk. The actuator may also be configured to rest on the ramp in a stand-by position. The shroud includes an inner peripheral side surface and an outer peripheral side surface. The shroud is configured to control an air-stream which flows in a direction from the pivot shaft toward the head-slider. The inner peripheral side surface and the outer peripheral side surface are configured to blast the head-slider with the air-stream upon spinning the disk when the head-slider is positioned away from the disk in the stand-by position.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Disk Drive

In accordance with embodiments of the present invention, deposited contaminants include dust and organic substances that may be in the form of viscous fluids. For example, dust coming from the outside the drive enclosure (DE) and dust in the form of wear debris generated by the sliding of a tab at a tip of a suspension on a ramp are deposited on a magnetic-recording disk. A head-slider flying over a spinning magnetic-recording disk gradually gathers organic substances which are scattered on the magnetic-recording disk onto the air bearing surface (ABS) of the head-slider. For example, organic substances vaporizing from the components packaged in a DE are condensed on the ABS and attach thereto, or are condensed to the magnetic-recording disk and attach thereto; and then, these organic substances adhere to the ABS of the head-slider flying over the magnetic-recording disk. In addition, at the HDD's operating temperature, organic substances vaporize from resin components, for example, a ramp, and adhesives, and as the temperature drops during periods of inactivity of the disk drive, organic substances are deposited onto the magnetic-recording disk surface. The head-slider flying above the spinning magnetic-recording disk gradually gathers organic substances dispersed upon the magnetic-recording disk onto the ABS.

In the absence of embodiments of the present invention, if the deposition of debris on the ABS increases, the head fly-height increases, and the debris deposit fills the clearance between the head-slider and the magnetic-recording disk at some point in the operation of the disk drive so that the head-slider contacts the magnetic-recording disk through the debris deposit; consequently, the head-slider rides on the debris deposit to increase the fly-height. As a result of the increased fly-height, data loss occurs such as a write error, or a read error. Embodiments of the present invention, remove a debris deposit such as dust and organic substances which are deposited on a head-slider's ABS to prevent such errors from occurring.

In accordance with embodiments of the present invention, a disk drive includes a head-slider configured to fly above a disk, an actuator configured to support the head-slider and to swing about a pivot shaft to move the head-slider in a radial direction of the disk, a ramp on which the actuator is configured to rest in a stand-by position, and a shroud including an inner peripheral side surface and an outer peripheral side surface, the shroud configured to control an air-stream which flows in a direction from the pivot shaft toward the head-slider; the inner peripheral side surface and the outer peripheral side surface are configured to blast the head-slider with the air-stream upon spinning the disk when the head-slider is positioned away from the disk in the stand-by position. The shroud having two side surfaces accomplishes effective removal of a debris deposit on the head-slider at the stand-by position by airflow of an air-stream.

In one embodiment of the present invention, at least a portion of at least one of the inner peripheral side surface and the outer peripheral side surface is configured to overlap the actuator at the stand-by position as viewed in a direction of the pivot shaft. This provides for blasting of the head-slider by the air-stream. In another embodiment of the present invention, at least a portion of the inner peripheral side surface and at least a portion of the outer peripheral side surface are configured to overlap the actuator at the stand-by position as viewed in the direction of the pivot shaft. This also provides for blasting of the head-slider by the air-stream.

In one embodiment of the present invention, the shroud further includes a disk-facing surface which is located closer to a circumferential edge of the magnetic-recording disk than is the inner peripheral side surface and faces the outer circumferential edge of the disk. This suppresses fluttering of the disk.

In another embodiment of the present invention, the head-slider, when located at the stand-by position, is located at a position disposed between the outer peripheral side surface and the inner peripheral side surface as viewed in the direction of the pivot shaft. This provides for blasting of the head-slider by the air-stream.

In one embodiment of the present invention, the in-take end of the inner peripheral side surface is located closer to the head-slider than the in-take end of the outer peripheral side surface. This directs the air-stream toward the head-slider as a result of the spinning of the disk. In another embodiment of the present invention, the shroud has a portion where the spacing between the inner peripheral side surface and the outer peripheral side surface decreases in a direction from the pivot shaft toward the head-slider. This removes a debris deposit by airflow of the air-stream.

In yet another embodiment of the present invention, the shroud further includes a bottom surface which connects the inner peripheral side surface and the outer peripheral side surface, between the inner peripheral side surface and the outer peripheral side surface. This blasts an air-stream at the head-slider. Moreover, in one embodiment of the present invention, the bottom surface has a contour which is shaped so as to direct the air-stream toward the head-slider. This also blasts an air-stream at the head-slider.

In one embodiment of the present invention, the ramp is located ahead of the distal end of the actuator and includes a ventilation hole through which the air-stream passes, and an air filter is placed ahead of the ventilation hole. This captures the debris deposit upon removal from the head-slider.

In embodiments of the present invention, a disk drive includes a head-slider configured to fly above a disk, an actuator configured to support the head-slider and to swing about a pivot shaft to move the head-slider in a radial direction of the disk, a ramp on which the actuator is configured to rest in a stand-by position, and a shroud including an outer peripheral side surface, the shroud configured to control an air-stream which is caused to flow in a direction from the pivot shaft toward the head-slider; the outer peripheral side surface is configured to blast the head-slider with the air-stream upon spinning the disk when the head-slider is positioned away from the disk in the stand-by position; the outer peripheral side surface is located further away from a circumferential edge of the disk than is a center line of the head-slider at a position closest to a virtual line drawn along a leading edge of the head-slider, and at least a portion of the side surface is configured to overlap the suspension at a position closer to the pivot shaft than the virtual line as viewed in a direction of the pivot shaft. The shroud having the outer peripheral side surface provides for removal of a debris deposit on the head-slider at the stand-by position by airflow of the air-stream.

Embodiments of the present invention are described for a hard-disk drive (HDD) as an example of a disk drive, by way of example without limitation thereto, as embodiments of the present invention apply more generally to other types of disk drive, for example, disk drives utilizing: optical disks, magneto-optical disks, flexible magnetic-recording disks and, as this list is not exhaustive, other types of disks, that may be known in the art. Embodiments of the present invention provide means for removal of a debris deposit on a head-slider. In accordance with embodiments of the present invention, an HDD includes a ramp that is configured to move the head-slider away from the magnetic-recording disk. HDD further includes an actuator that is configured to Support and to move the head-slider which is configured to rest in the stand-by position, also referred to by the term of art "home position," on the ramp when the head-slider is not engaged in accessing the magnetic-recording disk. In accordance with an embodiment of the present invention, while the actuator is standing by on the ramp, the head-slider is positioned away from and above the magnetic-recording disk, namely, the head-slider is positioned outside the periphery of the magnetic-recording disk.

In accordance with embodiments of the present invention, the HDD also includes a shroud to direct an air-stream toward the head-slider at the home position. During most of the operation of the disk drive, even when the head-slider is positioned at the home position, the magnetic-recording disk is spinning. The spinning of the magnetic-recording disk generates an air-stream and the shroud directs the air-stream toward the head-slider at the home position. The air-stream directed toward the head-slider by the shroud blows off the debris deposit on the head-slider to remove the debris deposit from the head-slider. To effectively direct the air-stream caused by the magnetic-recording disk's spinning toward the head-slider at the home position, the shroud is required to have an appropriate structure and to be located at an appropriate position. Before describing details of the shroud, the configuration of the HDD including the shroud is next described.

Figure 1:
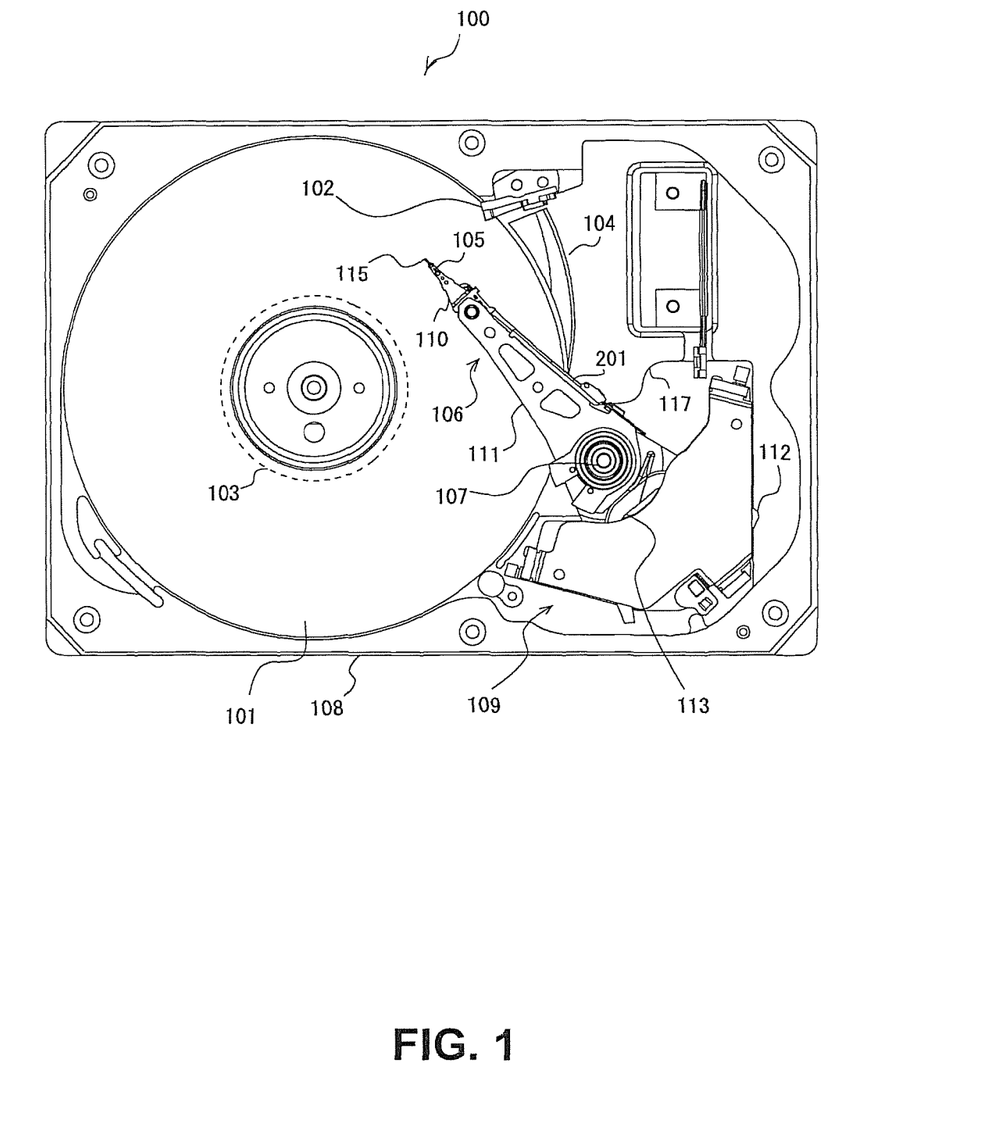
FIG. 1 is a plan view schematically depicting the configuration of an HDD, in accordance with an embodiment of the present invention.

With reference now to FIG. 1, in accordance with embodiments of the present invention, within a base 108 of an HDD 100, a spindle motor (SPM) 103 spins a magnetic-recording disk 101. As shown in the view of FIG. 1, the magnetic-recording disk 101 spins in a counterclockwise direction. As described herein, the direction along which a spindle shaft 107 lies is referred to as the top-bottom direction; the direction toward the base is referred to as downward and the direction toward a top cover for covering an opening of the base 108 is referred to as upward. So as not to unnecessarily complicate the description of FIG. 1, HDD 100 is shown with the top cover of the disk enclosure (DE) removed. An actuator 106 is rotatably supported by a pivot shaft 107 and is driven by a voice coil motor (VCM) 109 as a driving mechanism. The actuator 106 includes components of a suspension 110, an arm 111, a coil support 112, and a flat coil 113, which are longitudinally connected in this order beginning from a distal end of the actuator where a head-slider 105 is disposed. Some of the components of the actuator 106 may be integrated into a single component. The head-slider 105 is secured to the suspension 110.

With further reference to FIG. 1, in accordance with embodiments of the present invention, the VCM 109 swings the actuator 106 in a lateral direction, as shown within the plane of FIG. 1, on the pivot shaft 107 by a driving current fed to the flat coil 113 in accordance with control signals provided by a controller (not shown). The actuator 106 moves the head-slider 105 above the magnetic-recording disk 101 along a radial direction of a surface of the magnetic-recording disk 101, which enables the head-slider 105 to access a selected track of the magnetic-recording disk 101 when reading data from or writing data to the magnetic-recording disk 101, or retracts the head-slider 105 away from the magnetic-recording disk 101. The signals between the head-slider 105 and the controller are transmitted through transmission lines provided by traces 201 and a flexible printed circuit (FPC) 117.

With further reference to FIG. 1, in accordance with embodiments of the present invention, the HDD 100 may be provided with one or more magnetic-recording disks and head-sliders, of which magnetic-recording disks 101 and head-slider 105 are examples; a respective magnetic-recording disk and head-slider correspond to a recording surface. A magnetic-recording disk 101 may have a recording surface on either side, or alternatively on both sides. A head-slider 105 flies over the magnetic-recording disk 101 at a fly-height (FH) that corresponds to an air gap between the head-slider 105 and the recording surface of the magnetic-recording disk 101. The surface of a head-slider 105 that faces the magnetic-recording disk 101 is called the air bearing surface (ABS). An air pressure is generated by the viscosity of air between the ABS and the spinning magnetic-recording disk 101; the air pressure applied to the ABS of the head-slider 105 produces a force on the head-slider 105 that is balanced by a spring force applied by suspension 110 to the head-slider 105, which is directed toward the magnetic-recording disk 101, so that the head-slider 105 can fly above the magnetic-recording disk 101 at a fly-height determined by the balance of these forces.

With further reference to FIG. 1, in accordance with embodiments of the present invention, the head-slider 105 includes a substantially rectangular parallelepiped portion, also referred to by the term of art, "slider," and a magnetic-recording head including a read element and a write element. Typically, the magnetic-recording head is disposed in proximity to a trailing edge of the head-slider 105. The trailing edge of the head-slider 105 is the end surface of the head-slider 105 which is closer to the tip of the suspension 110 at the end of tab 115, as shown in FIG. 1. In contrast, the end surface of the head-slider 105 which is closer to the pivot shaft is called a leading edge. Since the magnetic-recording disk 101 spins counterclockwise, as shown in the view of FIG. 1, air flows into the space between the ABS and the magnetic-recording disk 101 from the leading edge and flows out from the trailing edge.

With further reference to FIG. 1, in accordance with embodiments of the present invention, a protruding tab 115, also referred to by the term of art, "merge lip," is provided at the tip of the suspension 110. When the magnetic-recording head is not accessing the magnetic-recording disk 101, the actuator 106 may rest on the ramp 102. As shown in FIG. 1, a clockwise rotation of the actuator 106 above the magnetic-recording disk 101 leads the tab 115 to ride onto the ramp 102. Then, the tab 115 slides on a stage of the ramp 102 with the rotation of the actuator 106, and the actuator 106 and the tab 115 stop at their respective predetermined stand-by positions, also referred to by the term of art, "home positions". When the actuator 106 is at the home position, the tab 115 is in contact with the ramp 102. When the actuator 106 rests on the ramp at the home position, the head-slider also rests at its own home position. At the home position, the head-slider 105 is not above the magnetic-recording disk 101, but at the outer position away from the magnetic-recording disk 101.

With further reference to FIG. 1, in accordance with embodiments of the present invention, the HDD 100 includes a shroud 104. The shroud 104 directs the air-stream generated by spinning of the magnetic-recording disk 101 toward the head-slider 105 at the home position to remove a debris deposit on the head-slider 105. The shroud 104 is provided in such a position to face the ramp 102 at the outside of the magnetic-recording disk 101. Typically, the shroud is made of a resin material, which is also used for the ramp 102. When the actuator 106 is at the home position, at least a portion of the shroud 104 overlaps the actuator 106 as viewed in the direction of the spindle shaft. The shroud 104 is away from the magnetic-recording disk 101 without an overlap as viewed in the top-bottom direction, which is the spindle-shaft direction, as previously described. As long as the shroud 104 does not block the movement of the actuator 106, the shroud 104 may be disposed in such a position that a portion of the shroud 104 overlaps the magnetic-recording disk 101 as viewed in the spindle-shaft direction. In accordance with an embodiment of the present invention, the shroud 104 generates an air-stream directed toward the head-slider 105 at the home position by controlling the airflow of the air-stream, by limiting the airflow of the airstream, caused by spinning of the magnetic-recording disk 101.

Figure 2:
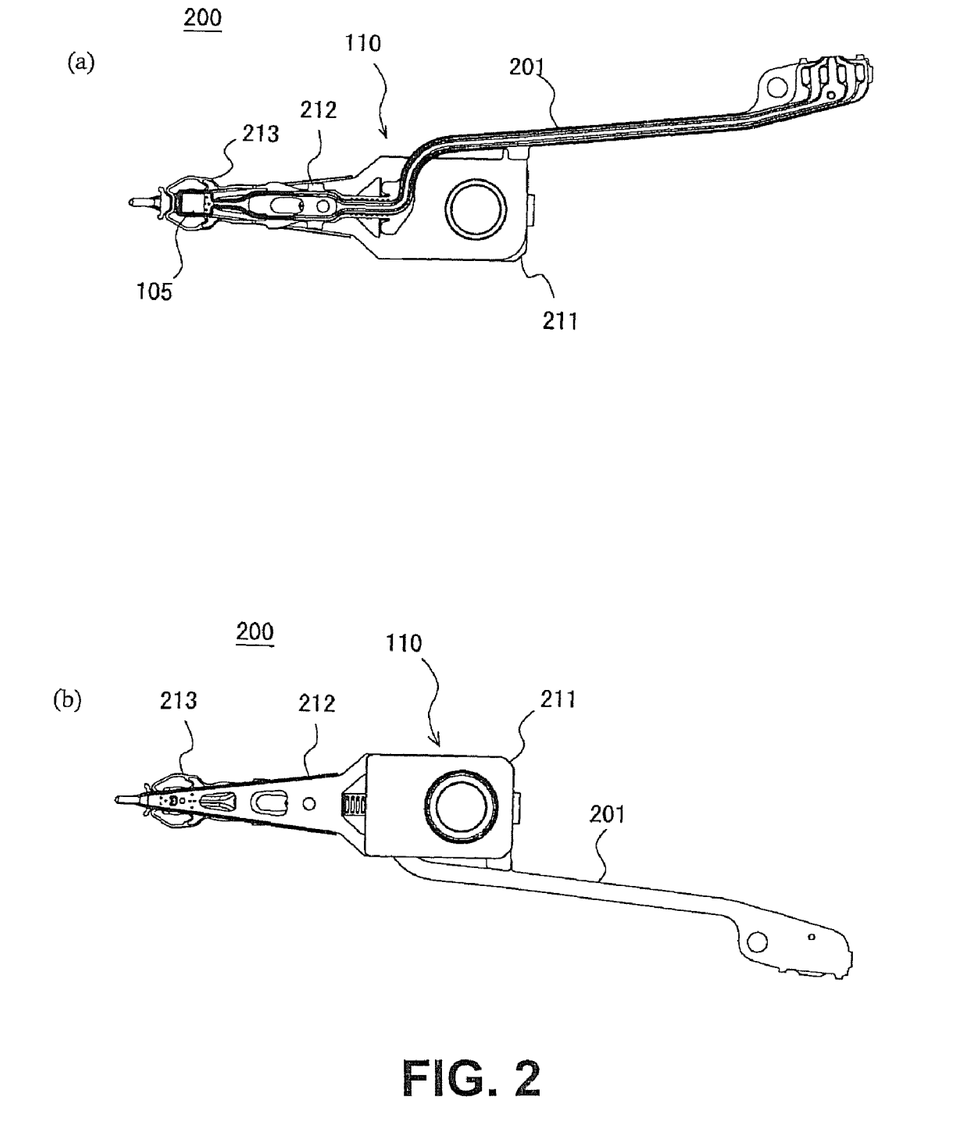
FIG. 2 are views schematically depicting the configuration of an HGA, in accordance with an embodiment of the present invention.

With reference now to FIGS. 2(a) and 2(b), in accordance with an embodiment of the present invention, the configuration of a head gimbal assembly (HGA) 200, which is an assembly of a head-slider 105 and a suspension 110, is shown. FIG. 2(a) is a view of the HGA as viewed from the head-slider side, which is the side of the head-slider that faces the magnetic-recording disk 101, also referred to by the term of art, "magnetic-recording-disk side," and FIG. 2(b) is a view as viewed from the opposite side of the head-slider 105, also referred to by the term of art, "backside". The suspension 110 generally includes a base plate 211, a load beam 212, and a gimbal 213, also referred to by the term of art, "flexure". The base plate 211, load beam 212, and gimbal 213 are connected with each other; and, the head-slider 105 is bonded to the gimbal 213. The load beam 212 has a tab 115 at its tip which is disposed proximately to the head-slider 105. The load beam 212 develops a force to press the head-slider 105 toward the disk. In accordance with one embodiment of the present invention, the suspension 110 and the traces 201 are formed as an integrated unit.

Figure 3:
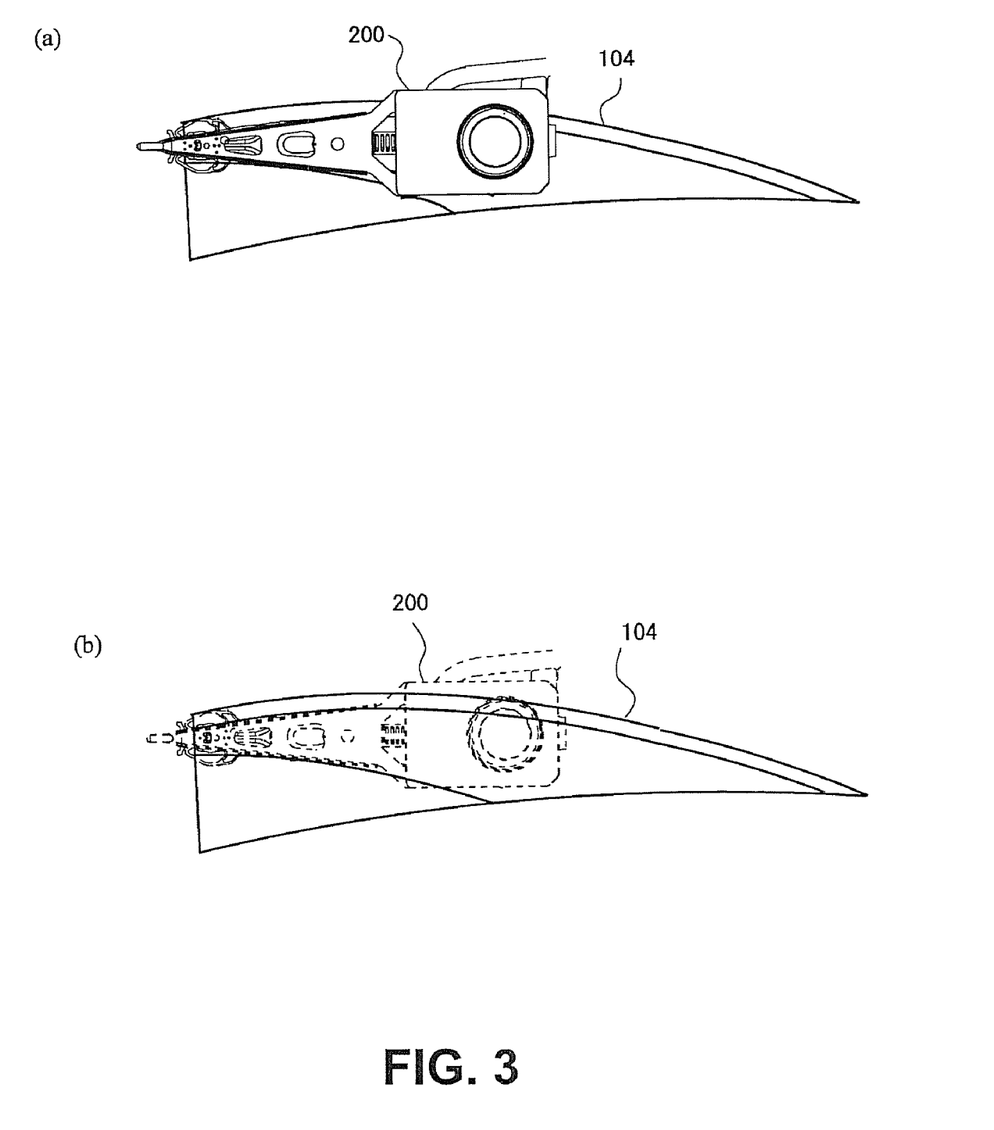
FIG. 3 are views schematically depicting a shroud and an HGA at the home position, in accordance with an embodiment of the present invention.

With reference now to FIG. 3, in accordance with an embodiment of the present invention, an HGA 200 of an actuator 106 at the home position and the relationship of the HGA 200 to a shroud 104 are depicted. As shown in FIGS. 3(a) and 3(b), at the home position, at least a portion of the HGA 200 is located in a position so as to overlap the shroud 104 as viewed in the pivot-shaft direction, which is the same direction as the spindle-shaft direction. In embodiments of the present invention, the shroud 104 does not block the swinging action of the actuator 106. Consequently, no portion of the head-slider 105 or the actuator 106 makes contact with the shroud 104; even at the home positions, the head-slider 105 and the actuator 106 are disposed away from the shroud 104 in the pivot-shaft direction.

Figure 4:
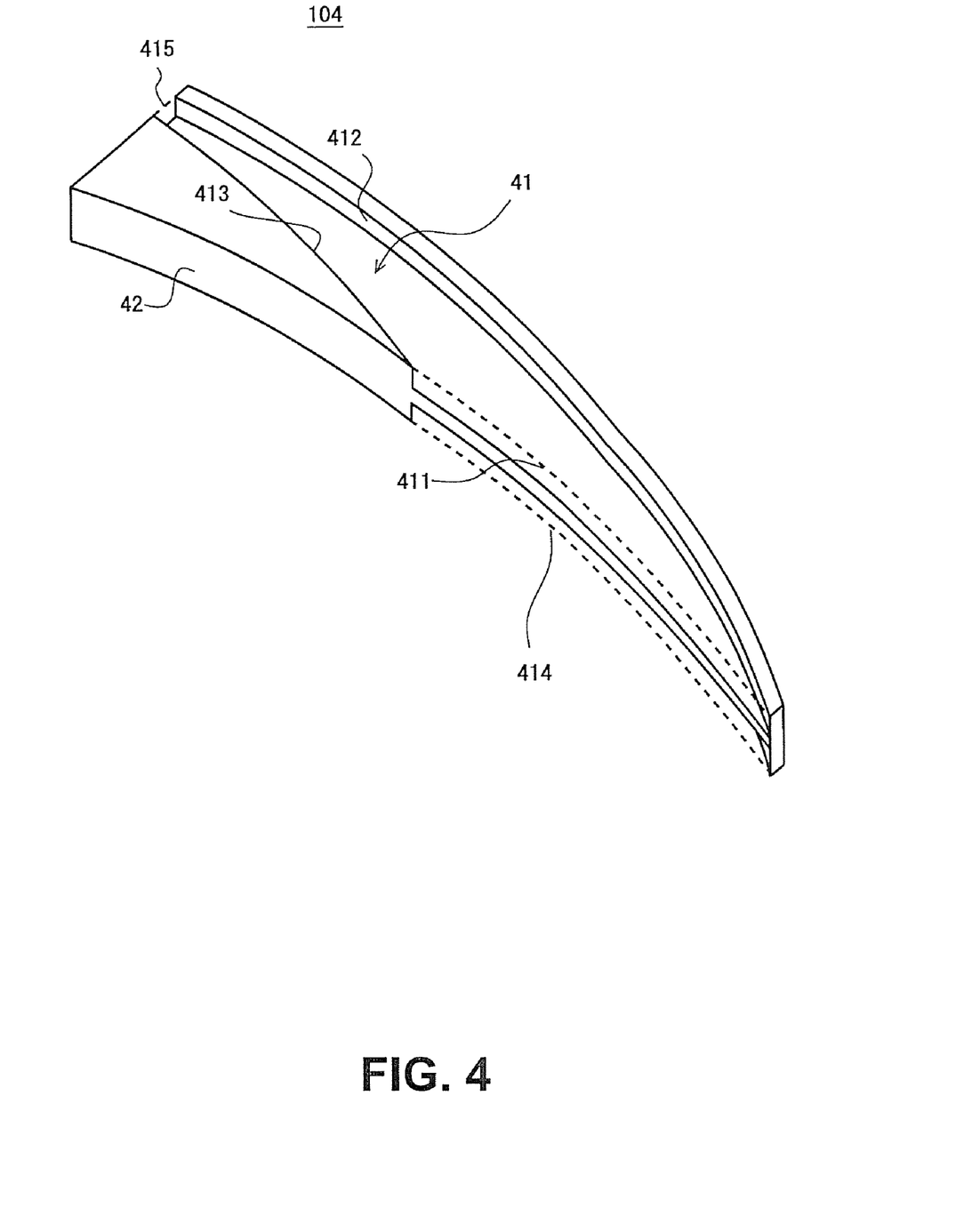
FIG. 4 is a perspective view schematically depicting the structure of the shroud, in accordance with an embodiment of the present invention.

With reference now to FIG. 4, in accordance with embodiments of the present invention, a perspective view schematically depicting the configuration of the shroud 104 is shown. The shroud 104 shown in FIG. 4 is for an HDD with a single disk and two heads, and has a single-tiered structure. The shroud 104 has top and bottom surfaces symmetrical with each other on the tier. The shape of the top surface illustrated in FIG. 4 is next described. The bottom surface has the same shape as the top surface.

With further reference to FIG. 4, in accordance with an embodiment of the present invention, the shroud 104 includes a channel 41 for controlling the airflow within the housing. The air-stream generated by spinning of the magnetic-recording disk 101 enters the channel 41 from an inlet 414, passes through the channel 41, passes out through an outlet 415, and then proceeds to head-slider 105. In one embodiment of the present invention, the channel 41 is a groove defined by a plurality of surfaces. Specifically, the channel 41 is defined by a bottom surface 411 of the channel 41, an outer peripheral side surface 412 of the channel 41, and an inner peripheral side surface 413 of the channel 41. The outer peripheral side surface 412 and the inner peripheral side surface 413 are disposed in a substantially vertical orientation with respect to the bottom surface 411; and, the outer peripheral side surface 412 and the inner peripheral side surface 413 have substantially the same height with respect to the bottom surface 411. The bottom surface 411 is substantially parallel to the recording surface, which is the main surface, of the magnetic-recording disk 101, so that the outer peripheral side surface 412 and the inner peripheral side surface 413 are oriented in the direction parallel to the spindle shaft of SPM 103.

With further reference to FIG. 4, in accordance with an embodiment of the present invention, the shroud 104 further includes a disk-facing surface 42 which faces the outer circumferential edge of the magnetic-recording disk 101. The disk-facing surface 42 is located closer to a circumferential edge of the magnetic-recording disk than is the channel 41, and the inner peripheral side surface 413 of the channel 41. Reducing the gap between the shroud 104 and the magnetic-recording disk 101 results in reduction of fluttering of the magnetic-recording disk 101. The disk-facing surface 42 is substantially parallel to the spindle shaft in the top-bottom direction and substantially parallel to the outer circumferential edge of the magnetic-recording disk 101 in the disk circumferential direction.

Figure 5:
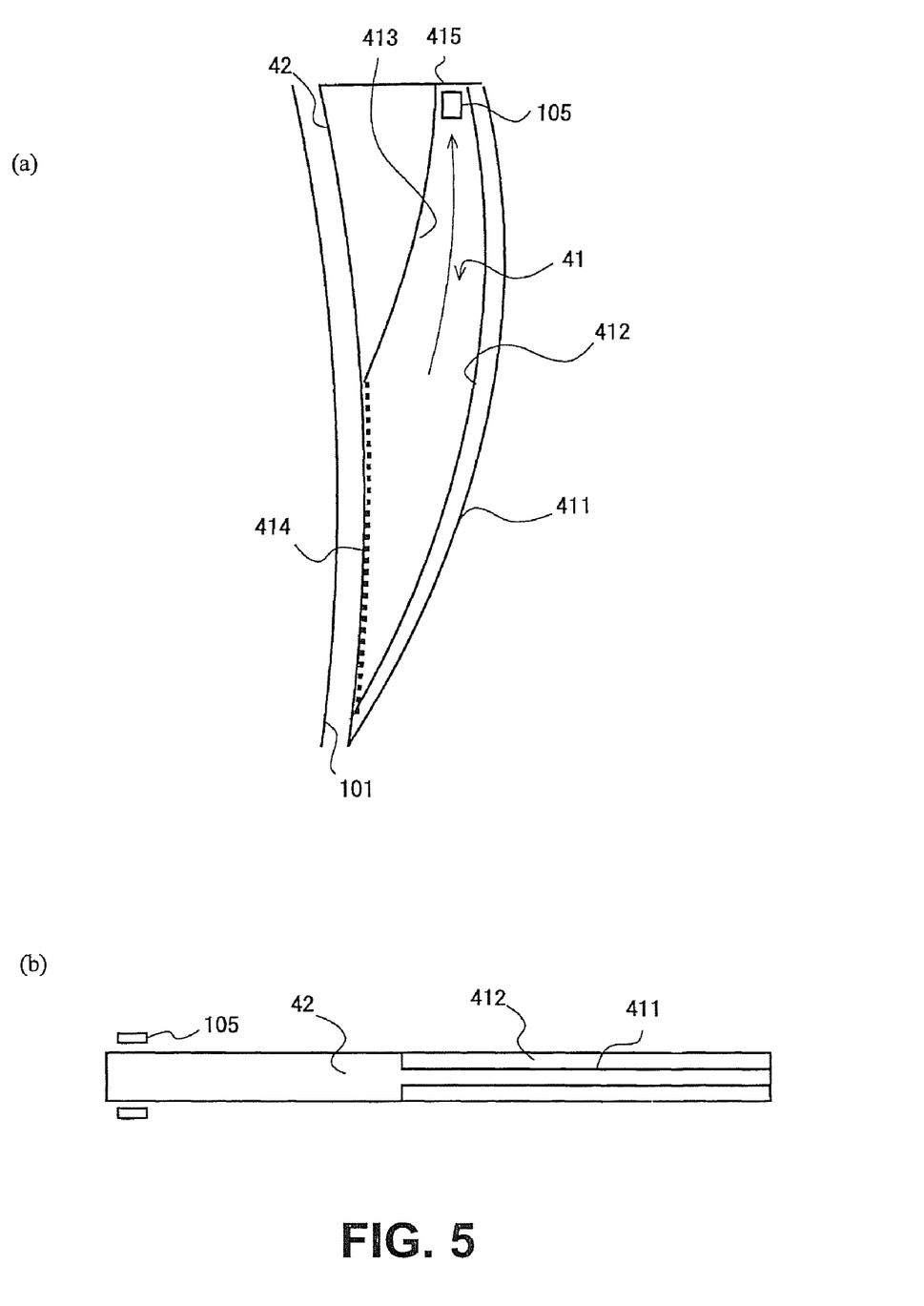
FIG. 5 are views schematically depicting a shroud and head-sliders at the home position, in accordance with an embodiment of the present invention.

With reference now to FIG. 5, in accordance with embodiments of the present invention, a plan view schematically depicting the positional relationship between the shroud 104, the head-slider 105, and the magnetic-recording disk 101 is shown in FIG. 5(a); and, a side view schematically depicting the positional relationship between the shroud 104, the head-slider 105, and the magnetic-recording disk 101 is also shown in FIG. 5(b). The air-stream generated by spinning of the magnetic-recording disk 101 enters the channel 41 from the inlet 414 of the channel 41 and then passes out through the outlet 415 of the channel 41. In an embodiment of the present invention, the head-slider 105 at the home position rests at a position where the head-slider 105 overlaps the shroud 104 as viewed in the top-bottom direction. On the other hand, as shown in FIG. 5(b), as viewed in a radial direction of the magnetic-recording disk 101, the head-slider 105 does not overlap the shroud 104; the head-slider 105 is not located within the channel 41 but located away from the channel 41, and the outer peripheral side surface 412 and the inner peripheral side surface 413 of the channel 41.

With further reference to FIGS. 4 and 5(a), in accordance with an embodiment of the present invention, the outlet 415 of the channel 41 is smaller than the inlet 414. The inlet 414 can be defined by connecting the in-take end, which is the edge, of the inner peripheral side surface 413 and the in-take end, which is the edge, of the outer peripheral side surface 412 by a curved line parallel to the outer circumferential edge of the magnetic-recording disk 101, which is parallel to the disk-facing surface 42. The outlet 415 can be defined by connecting the outlet ends of the outer peripheral side surface 412 and the inner peripheral side surface 413 of the channel 41. The area of the outlet 415 is smaller than that of the inlet 414, so that the air flows faster at the outlet 415 than at the inlet 414; the increased airflow of the airstream at the outlet 415 achieves removal of the debris deposit on the head-slider 105. A wider inlet 414 allows a greater amount of airflow of the air-stream to be taken into the channel 41.

With further reference to FIGS. 4 and 5(a), in accordance with an embodiment of the present invention, the spacing from the outer peripheral side surface 412 to the inner peripheral side surface 413 of the channel 41 gradually decreases from the inlet 414 toward the outlet 415. In other words, the cross-sectional area of the channel 41 gradually decreases from the inlet 414 toward the outlet 415. A portion where the spacing decreases is formed in the channel 41 to increase the speed of the air-stream directed towards the head-slider 105. In proximity to the location where the head-slider 105 is parked in the channel 41, the minimum spacing between the outer peripheral side surface 412 to the inner peripheral side surface 413 of the channel 41 is located. The cross-sectional area of the channel 41 is the area of the portion of the channel which is defined by the minimum spacing between opposing surfaces of the outer peripheral side surface 412 and the inner peripheral side surface 413 of the channel 41. The inner peripheral side surface 413 and the outer peripheral side surface 412 are smoothly curved surfaces. The smoothness of the surfaces of the inner peripheral side surface 413 and the outer peripheral side surface 412 reduces the turbulence within the air-stream passing through the channel 41 to effectively blast the head-slider 105 with the air-stream.

With further reference to FIGS. 4 and 5(a), in accordance with an embodiment of the present invention, the inner peripheral side surface 413 is shorter than the outer peripheral side surface 412 of the channel in the disk circumferential direction. The in-take end of the inner peripheral side surface 413 is located closer to the head-slider 105 than the in-take end of the outer peripheral side surface 412. Consequently, at a position closer to the pivot shaft than the inlet 414, the magnetic-recording disk 101 faces the outer peripheral side surface 412 without being screened from the magnetic-recording disk 101 by the inner peripheral side surface 413. Along the inlet 414, the inner peripheral side surface 413 is absent between the magnetic-recording disk 101 and the inlet side of the outer peripheral side surface 412. The inner peripheral side surface 413 could block airflow of the air-stream entering the channel 41. Thus, shortening the inner peripheral side surface 413 near the inlet enables the airflow of the air-stream to be introduced along the outer peripheral side surface 412 into the inlet 414 without being blocked by the inner peripheral side surface 413. In one embodiment of the present invention, to effectively introduce the airflow of the air-stream into the channel 41, the in-take end of the outer peripheral side surface 412 is elongated toward the vicinity of the outer circumferential edge of the magnetic-recording disk 101.

With further reference to FIGS. 4 and 5(a), in accordance with an embodiment of the present invention, on the magnetic-recording-disk side of the inner peripheral side surface 413, the disk-facing surface 42 is provided. Providing the disk-facing surface 42 closer to the disk than the inner peripheral side surface 413 reduces the fluttering of the magnetic-recording disk 101. In one embodiment of the present invention, to suppress the disk fluttering, the gap between the outer circumferential edge of the magnetic-recording disk 101 and the disk-facing surface 42 is as small and as uniform as possible. The disk-facing surface 42 is a curved surface along the outer circumferential edge of magnetic-recording disk space 101 in the circumferential direction.

With further reference to FIGS. 4 and 5(a), for the embodiment of the present invention described above, the shroud 104 has a plate-shaped portion including a bottom surface 411; but, this provision of a bottom surface 411 is by way of example and not limitation thereto, as embodiments of the present invention include those in which a bottom surface 411 may be absent, or omitted. When the actuator 106 is at the home position, the actuator 106, primarily the suspension 110, is present between the inner peripheral side surface 413 and the outer peripheral side surface 412 of the channel 41; the actuator 106 can also regulate the air-stream directed at the head-slider 105.

With further reference to FIGS. 4 and 5(a), in accordance with an embodiment of the present invention, to suppress turbulence within the air-stream, the bottom surface 411 may provide at least a portion of the area between the inner peripheral side surface 413 and the outer peripheral side surface 412 of the channel 41. In another embodiment of the present invention, the bottom surface 411 extends from the outlet ends of the inner peripheral side surface 413 and the outer peripheral side surface 412 toward the in-take ends of the inner peripheral side surface 413 and the outer peripheral side surface 412. In yet another embodiment of the present invention, the bottom surface 411 extends from the in-take ends of the inner peripheral side surface 413 and the outer peripheral side surface 412 to the outlet ends of the inner peripheral side surface 413 and the outer peripheral side surface 412 as shown in FIGS. 4 and 5(a).

With further reference to FIGS. 4 and 5(a), in accordance with an embodiment of the present invention, the bottom surface 411 is useful if the number of head-sliders and suspensions, of which head-slider 105 and suspension 110 are examples, is odd and a head-slider 105 and a suspension 110 are omitted on one side of an arm 111. Since a portion of the shroud 104 including the inner peripheral side surface 413 cannot be free-floating, a structure is provided that connects the portion of the shroud 104 including the inner peripheral side surface 413 and a portion of the shroud 104 including the outer peripheral side surface 412. The plate portion including the bottom surface 411 of the channel 41 provides such a structure that provides the connecting function for portions of the shroud 104 that include the inner peripheral side surface 413 and the outer peripheral side surface 412.

Figure 6:
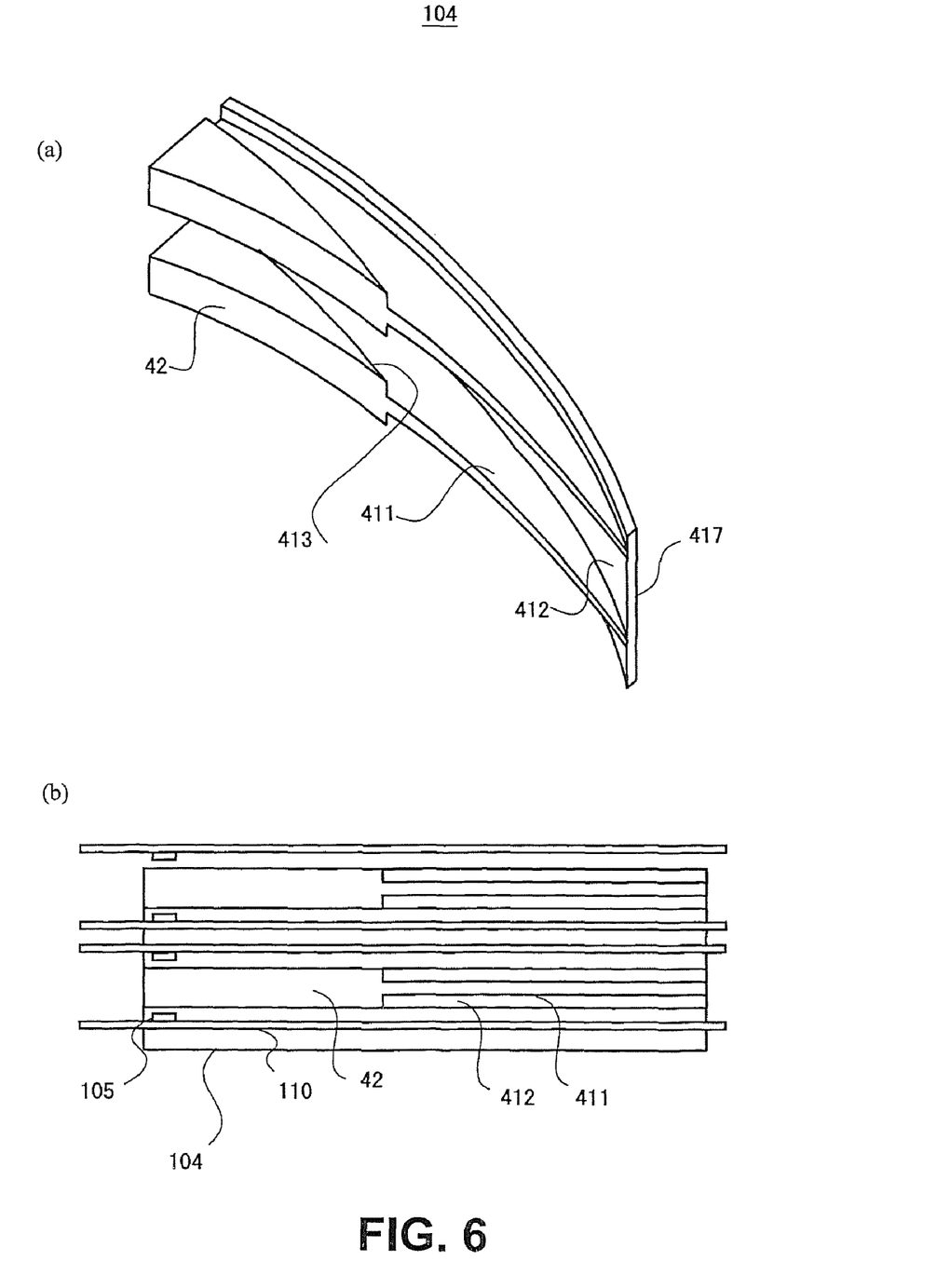
FIG. 6 are a perspective view and a side view schematically depicting the structure of a multi-tiered shroud, in accordance with an embodiment of the present invention.

With reference now to FIG. 6(a), in accordance with an embodiment of the present invention, a perspective view schematically depicting a shroud 104 for an HDD with two disks and four heads is shown. The shroud 104 has a two-tiered structure having two tiers connected by a connecting portion 417 on the outer periphery. Channels are provided on the both sides of each tier; there are four channels corresponding to the four heads. The structure of each channel is the same as the one described with reference to FIGS. 4, 5(a) and 5(b).

With reference now to FIG. 6(a), in accordance with an embodiment of the present invention, a side view schematically depicting the positional relationship between the multi-tiered shroud 104 shown in FIG. 6(a), an actuator 106, and head-sliders 105 is shown. With the exception that the shroud 104 has a multi-tiered structure and the number of head-sliders 105 and suspensions 110 for supporting the head-sliders is greater, the structure is substantially the same as the structure shown in FIG. 5(b).

Figure 7:
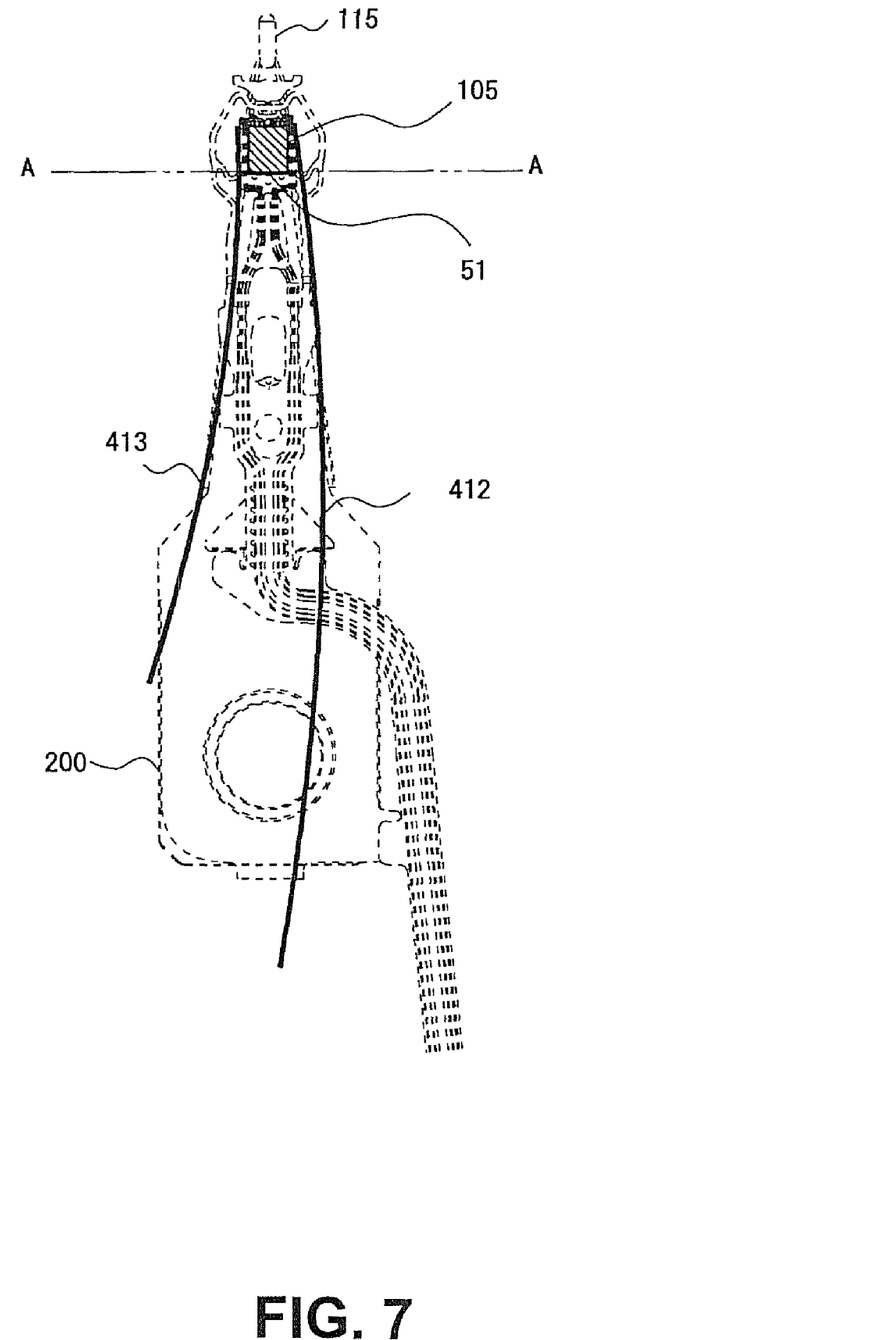
FIG. 7 is a view schematically depicting an inner peripheral side surface and an outer peripheral side surface of the channel of a shroud, and a head-slider at the home position, in accordance with an embodiment of the present invention.

With reference now to FIG. 7, in accordance with an embodiment of the present invention, an HGA 200 at the home position, an inner peripheral side surface 413, and an outer peripheral side surface 412 are schematically depicted. FIG. 7 shows the spatial relationship among the HGA 200, the inner peripheral side surface 413, and the outer peripheral side surface 412 at the home position as viewed in the pivot-shaft direction. In accordance with embodiments of the present invention, the shape of the channel 41 and the relationship between the channel 41 and the head-slider 105 as depicted in FIG. 7 influence the effectiveness of the air blast at the head-slider 105 in the home position by the air-stream. If the inner peripheral side surface 413 and the outer peripheral side surface 412 of the channel 41 are remote from the head-slider 105, the head-slider 105 does not receive strong airflow from the air-stream. Thus, in accordance with embodiments of the present invention, the inner peripheral side surface 413 and the outer peripheral side surface 412 are disposed in such a position that at least a portion of the inner peripheral side surface 413 and a portion of the outer peripheral side surface 412 overlap the actuator 106 at the home position as viewed in the pivot shaft direction. In one embodiment of the present invention, the inner peripheral side surface 413 and the outer peripheral side surface 412 are disposed in such a position that at least a portion of the inner peripheral side surface 413 and a portion of the outer peripheral side surface 412 overlap the suspension 110. The shapes and the positions of the inner peripheral side surface 413 and the outer peripheral side surface 412 with respect to the leading edge 51 of a head-slider 105 are next described.

With further reference to FIG. 7, in accordance with an embodiment of the present invention, the ends, which are the ends closer to tab 115, of the inner peripheral side surface 413 and the outer peripheral side surface 412 of the channel 41 are located ahead of, in other words, closer to the tip of the suspension 110 than, the head-slider 105; and, the head-slider 105 is located at a position disposed between the inner peripheral side surface 413 and the outer peripheral side surface 412. At the same position as the leading edge 51 relative to the front-to-rear direction of the actuator 106 (shown by the line A-A in FIG. 7), the inner peripheral side surface 413 and the outer peripheral side surface 412 are located closer to a circumferential edge of the magnetic-recording disk 101 and further from the circumferential edge of the magnetic-recording disk 101 than is the head-slider 105, respectively.

Figure 8:
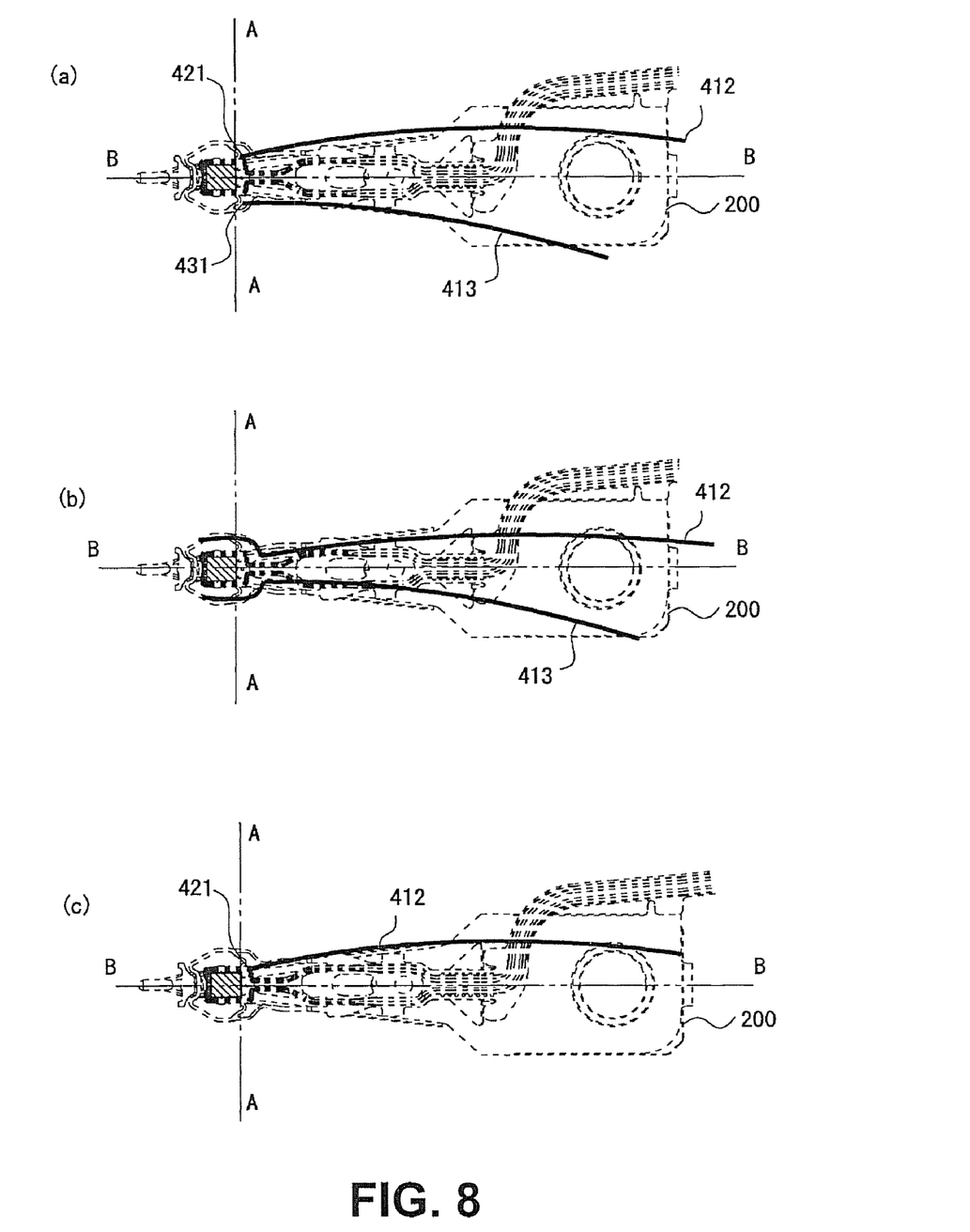
FIG. 8 are views each schematically depicting a inner peripheral side surface and an outer peripheral side surface of the channel of the shroud, and a head-slider at the home position, in accordance with an embodiment of the present invention.

With reference now to FIG. 8(a), in accordance with an embodiment of the present invention, the inner peripheral side surface 413 and the outer peripheral side surface 412 may have structures different from the example described above in the discussion of FIG. 7. As shown in FIG. 8(a), the inner peripheral side surface 413 and the outer peripheral side surface 412 terminate before the leading edge 51. Namely, the ends 431 and 421, which are the ends closer to the tab 115, of the inner peripheral side surface 413 and the outer peripheral side surface 412, respectively, are closer to the pivot shaft than the leading edge 51 of the head slider 105. In such a structure, the ends 431 and 421 of the inner peripheral side surface 413 and the outer peripheral side surface 412 may be located at some position along the radial direction of the magnetic-recording disk 101. In one embodiment of the present invention, to effectively direct the air-stream toward the head-slider 105, the end 431 of the inner peripheral side surface 413 is located closer to a circumferential edge of the magnetic-recording disk 101 than is the center line of the head-slider 105, which is shown by the line B-B in FIG. 8(a) along the swing direction of the head-slider 105. Similarly, in another embodiment of the present invention, the end 421 of the outer peripheral side surface 412 is located further away from a circumferential edge of the magnetic-recording disk 101 than is the center line of the head-slider 105 along the swing direction of the head-slider 105. In an embodiment of the present invention, considering removal of a debris deposit from the tab 115, the end 431 is located closer to a circumferential edge of the magnetic-recording disk 101 than is the inner edge of the leading edge 51; and, the end 421 is located further away from a circumferential edge of the magnetic-recording disk 101 than is the outer edge of the leading edge 51. In one embodiment of the present invention, the ends 421 and 431 are located at the positions where they overlap the suspension 110 in the pivot-shaft direction while satisfying the above-described positional relationship with the head-slider 105. For some embodiments of the present invention, the spacing between the inner peripheral side surface 413 and the outer peripheral side surface 412 decreases in closer proximity to the leading edge 51, as shown in FIG. 8(a).

On the other hand, with reference now to FIG. 8(b), in accordance with another embodiment of the present invention, a channel 41 may have an inner peripheral side surface 413 and an outer peripheral side surface 412 that diverge from one another at the end of the channel 41 in such a way so as to enclose the head-slider 105, which is also effective for removal of a debris deposit from the head-slider 105. As shown in FIG. 8(b), the channel 41 is narrower in the vicinity of the leading edge 51 and expands in the radial direction of the magnetic-recording disk 101, which is the top-bottom direction in FIG. 8(b), in proceeding towards the trailing edge along line B-B. The inner peripheral side surface 413 and the outer peripheral side surface 412 extend in such a way so as to surround both sides of the head-slider 105. Since the spacing between the inner peripheral side surface 413 and the outer peripheral side surface 412 is small in the vicinity of the leading edge 51, a faster air-stream is directed toward the head-slider 105. In addition, both of the left and right side surfaces of the head-slider 105 suppress dispersion of the air-stream. This arrangement of the inner peripheral side surface 413 and the outer peripheral side surface 412 of the channel 41 provides a stronger blast from the air-stream directed at the head-slider 105 for effective removal of a debris deposit. For the example embodiments of the present invention described in the discussion of FIGS. 8(a) and 8(b), the shroud 104 has two side surfaces: the inner peripheral side surface 413 and the outer peripheral side surface 412. In these example embodiments of the present invention, effective control of the air-stream that is directed towards the head-slider 105 is provided by the two, the inner and the outer, side surfaces 413 and 412, which are walls, of the channel 41; but, other embodiments of the present invention in which the channel 41 is not so constructed are next described.

With reference now to FIG. 8(c), in accordance with another embodiment of the present invention, the shroud 104 may include the outer peripheral side surface 412, alone. FIG. 8(c) depicts a structure in which the inner peripheral side surface 413 has been removed from the shroud structure in FIG. 8(a). Alternatively, a shroud with a structure in which the inner peripheral side surface has been removed from the shroud structure in FIG. 7, or FIG. 8(b), are within the spirit and scope of embodiments of the present invention. In a shroud 104 without the inner peripheral side surface 413, however, the shape and position of the outer peripheral side surface 412 differ from those of a shroud with both the inner and outer side surfaces 412 and 413. Specifically, in one embodiment of the present invention, at least a portion of the outer peripheral side surface 412 overlaps the actuator 106. In addition, in another embodiment of the present invention, the portion of the outer peripheral side surface 412 on the pivot-shaft side, which is closest to the position of the leading edge, denoted by the line A-A in FIG. 8(c) may be located further away from a circumferential edge of the magnetic-recording disk 101 than is the center position of the leading edge 51. Similar to the example described in the discussion of FIG. 8(b), if the outer peripheral side surface 412 extends further than the leading edge 51 toward the tab 115, the point at which the line A-A crosses the outer peripheral side surface 412 is located further away from a circumferential edge of the magnetic-recording disk 101 than is the leading edge 51, then the structure, in which the outer peripheral side surface 412 extends further than the leading edge 51 toward the tab 115, provides similar functionality to the structure described in the discussion of FIG. 8(b)

With further reference to FIG. 8(c), in accordance with an embodiment of the present invention, if the end 421 of the outer peripheral side surface 412 is located closer to the pivot shaft than the leading edge 51, the end 421 is located further away from a circumferential edge of the magnetic-recording disk 101 than is the center of the leading edge 51. In an embodiment of the present invention, the end is located in the vicinity of the head-slider 105 on the outer side of the leading edge 51. In an embodiment of the present invention, the end 421 is located further away from a circumferential edge of the magnetic-recording disk 101 than is the head-slider 105 and overlaps the suspension 110 in the pivot-shaft direction. For embodiments of the present invention, channels, of which channel 41 is an example, that are associated with respective head-sliders, of which head-slider 105 is an example, have the same structure, and uniform characteristics with respect to the head-sliders; thus, channels having the same structure provide a simple shape for the shroud 104. Depending on the design of the shroud, some of the channels of the shroud, of which channel 41 is an example, may have a structure that differs from the structure of other channels of the shroud. In the preceding discussion, a technique for controlling airflow of an air-stream to direct the air-stream at a head-slider 105 by the outer peripheral side surface 412 and the inner peripheral side surface 413 has been described. In one embodiment of the present invention, the bottom surface 411 may also have a shape to direct an air-stream towards the head-slider 105. An example of such a shape for the bottom surface is next described.

Figure 9:
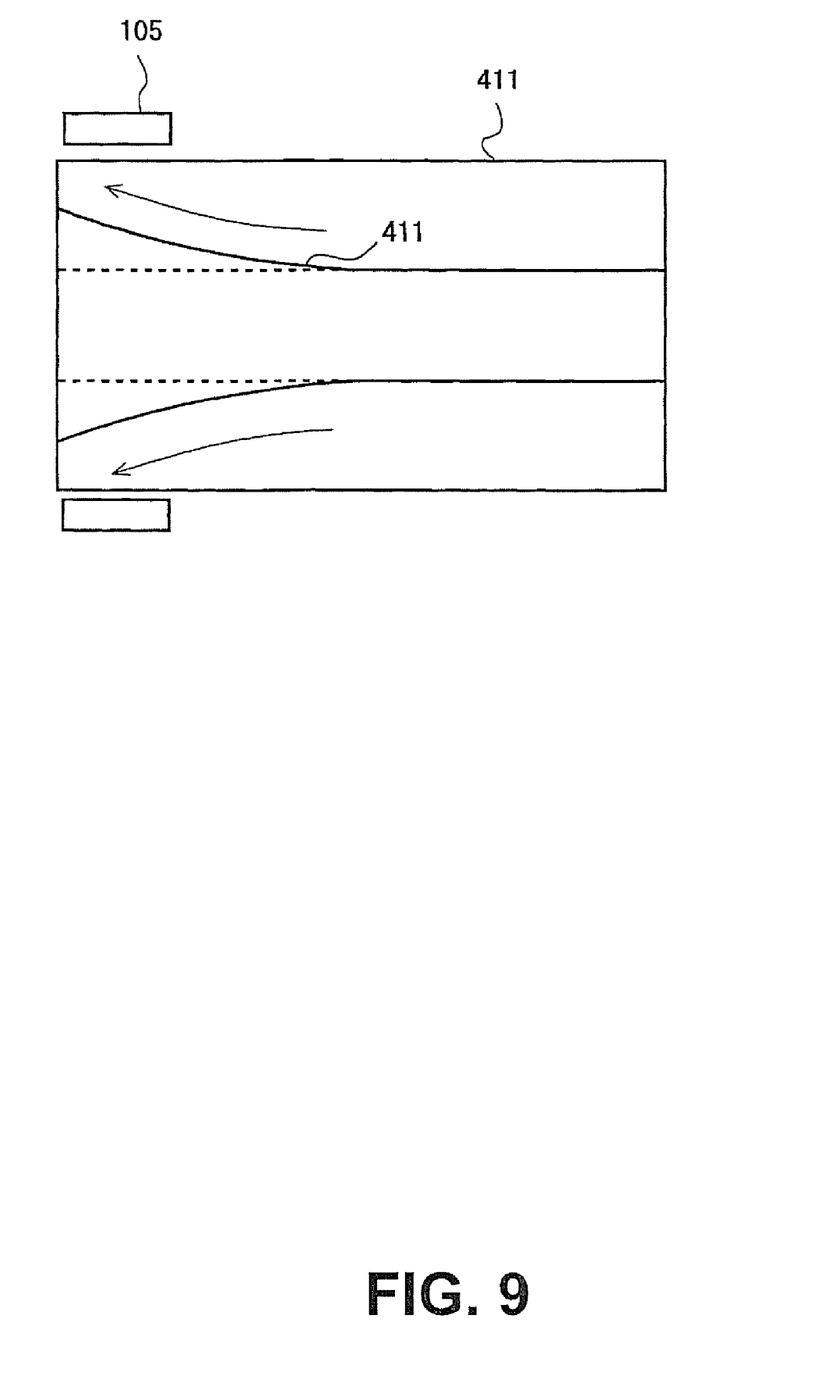
FIG. 9 is a view schematically depicting the shape of a bottom surface of the channel, in accordance with an embodiment of the present invention.

With reference now to FIG. 9, in accordance with another embodiment of the present invention, head-sliders 105 at the home position, bottom surfaces 411, and outer peripheral side surfaces 412 are schematically depicted. A bottom surface 411 is contoured toward its end. The contour is shaped so that the bottom surface 411 is disposed closer to the head-slider 105 in proceeding from up-stream toward down-stream, in a direction of the airflow of the air-stream; and, the contour may be curved. To effectively direct an air-stream towards the head-slider 105, the contour starts before the leading edge 51. As shown in FIG. 9, the head-slider 105 overlaps the bottom surface 411 as viewed in the direction of the spindle shaft. The head-slider 105 may be disposed ahead of the outlet end of the bottom surface 411, as in the example of FIG. 8(a).

Figure 10:
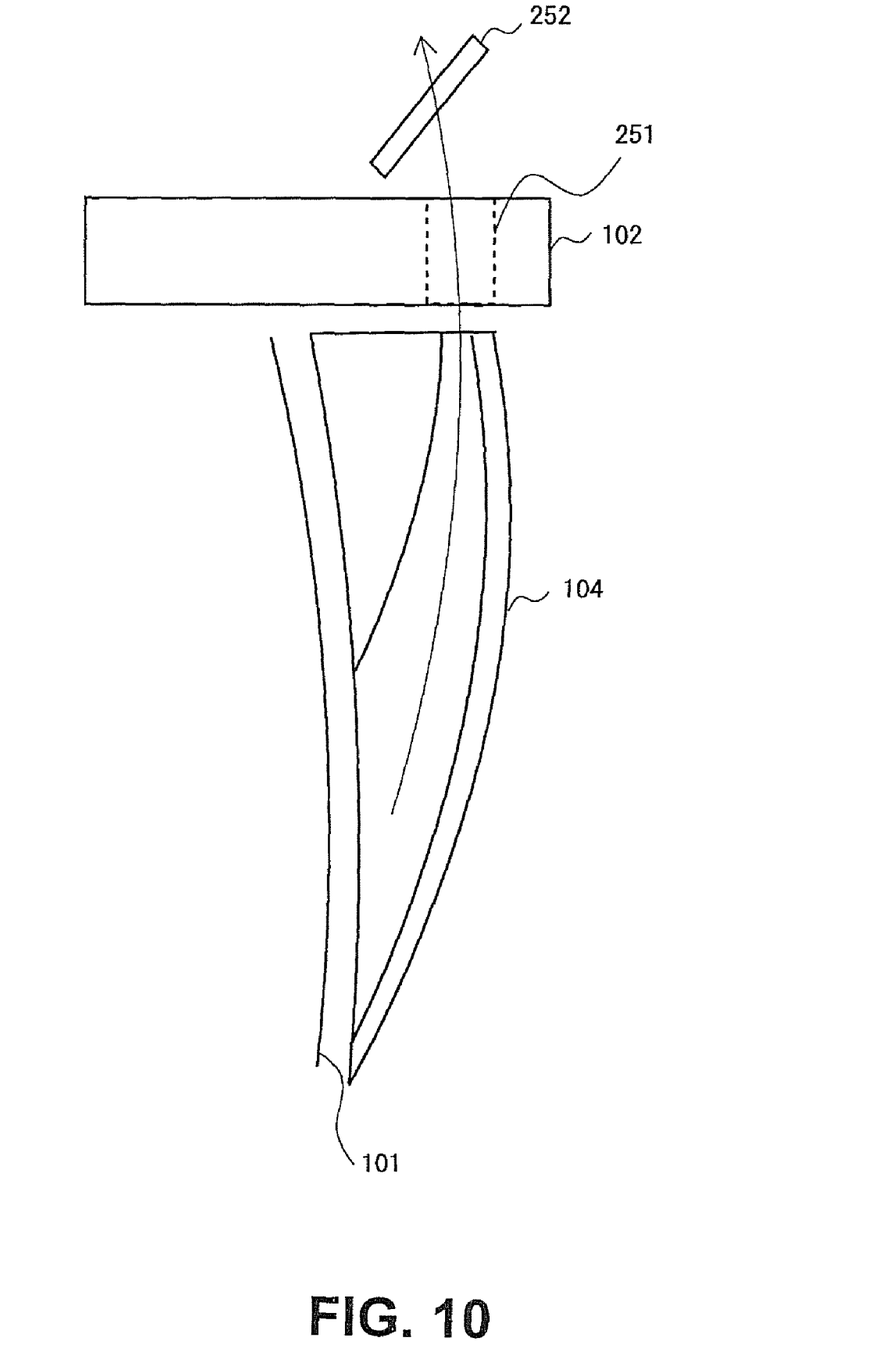
FIG. 10 is a view schematically depicting an air filter, in accordance with an embodiment of the present invention.

With reference now to FIG. 10, in accordance with another embodiment of the present invention, a debris deposit which has been blown off the head-slider 105 may fly towards the tab 115 and the ramp 102. In one embodiment of the present invention, to prevent re-attachment of contaminants in the debris deposit to the magnetic-recording disk 101, or the actuator 106, the contaminants are immediately collected by an air filter. In an embodiment of the present invention, as schematically shown in FIG. 10, a hole 251, which is a ventilation hole, for the air-stream to pass through is provided in the ramp 102; and moreover, an air filter 252 is placed ahead of the hole. In an embodiment of the present invention, the air-stream formed by the shroud 104 removes the debris deposit on the head-slider 105 and the tab 115; the air-stream carrying the debris deposit passes through the ventilation hole 251 in the ramp 102, and is caught by the air filter 252.

As set forth above, various embodiments of the present invention have been described by way of examples, but embodiments of the present invention are not limited to these examples. For example, a person skilled in the art might easily modify, add, or convert the components in the above examples within the spirit and scope of embodiments of the present invention. For example, the shroud may be formed integrally with other component, as long as the shroud is secured directly, or indirectly, to the base. The shroud may also be composed of a plurality of components.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive comprising:
    a head-slider, said head-slider configured to fly above a disk;
    an actuator, said actuator configured to support said head-slider and to swing about a pivot shaft to move said head-slider in a radial direction of said disk;
    a ramp on which said actuator is configured to rest in a stand-by position; and
    a shroud comprising an inner peripheral side surface and an outer peripheral side surface, said shroud having a portion where spacing between said inner peripheral side surface and said outer peripheral side surface decreases in a direction from said pivot shaft toward said head-slider and configured to control an air-stream which flows in a direction from said pivot shaft toward said head-slider, wherein said inner peripheral side surface and said outer peripheral side surface are configured to blast said head-slider with said air-stream upon spinning said disk when said head-slider is positioned away from said disk in said stand-by position,
    wherein at least a portion of at least one of said inner peripheral side surface and at least a portion of said outer peripheral side surface is configured to overlap said actuator at said stand-by position as viewed in a direction of said pivot shaft.

2. The disk drive of claim 1, wherein said shroud further comprises a bottom surface which connects said inner peripheral side surface and said outer peripheral side surface, between said inner peripheral side surface and said outer peripheral side surface.

3. The disk drive of claim 2, wherein said bottom surface has a contour which is shaped so as to direct said air-stream toward said head-slider.

4. The disk drive of claim 1, wherein said shroud further comprises a disk-facing surface which is located closer to an outer circumferential edge of said disk than is said inner peripheral side surface and faces said outer circumferential edge of said disk.

5. The disk drive of claim 1, wherein said head-slider, when located at said stand-by position, is located at a position disposed between said outer peripheral side surface and said inner peripheral side surface as viewed in a direction of said pivot shaft.

6. The disk drive of claim 1, wherein an in-take end of said inner peripheral side surface is located closer to said head-slider than an in-take end of said outer peripheral side surface.

7. The disk drive of claim 1, wherein said ramp is located ahead of a distal end of said actuator and comprises a ventilation hole through which said air-stream passes; and an air filter is placed ahead of said ventilation hole.

8. A disk drive comprising:
    a head-slider, said head-slider configured to fly above a disk;
    an actuator, said actuator configured to support said head-slider and to swing about a pivot shaft to move said head-slider in a radial direction of said disk;
    a ramp on which said actuator is configured to rest in a stand-by position; and
    a shroud comprising an outer peripheral side surface, said shroud configured to control an air-stream which is caused to flow in said direction from said pivot shaft toward said head-slider, wherein said outer peripheral side surface is configured to blast said head-slider with said air-stream upon spinning said disk when said head-slider is positioned away from said disk in said stand-by position, wherein said outer peripheral side surface is located further away from a circumferential edge of said disk than is a center line of said head-slider at a position closest to a virtual line drawn along a leading edge of said head-slider, and at least a portion of said outer peripheral side surface is configured to overlap said actuator at a position closer to said pivot shaft than said virtual line as viewed in a direction of said pivot shaft.

9. The disk drive of claim 8, wherein said outer peripheral side surface is elongated around said outer periphery of said head-slider.

10. The disk drive of claim 8, wherein said outer peripheral side surface has a contour which is shaped so as to direct said air-stream toward said head-slider.

11. The disk drive of claim 8, wherein said ramp is located ahead of a distal end of said actuator and comprises a ventilation hole through which said air-stream passes; and an air filter is placed ahead of said ventilation hole.

* * * * *